(12) United States Patent
Day et al.

(10) Patent No.: US 7,363,544 B2
(45) Date of Patent: Apr. 22, 2008

(54) PROGRAM DEBUG METHOD AND APPARATUS

(75) Inventors: Michael Norman Day, Round Rock, TX (US); Sidney James Manning, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 10/697,865

(22) Filed: Oct. 30, 2003

(65) Prior Publication Data
US 2005/0097398 A1 May 5, 2005

(51) Int. Cl.
*G06F 11/00* (2006.01)
*G06F 11/36* (2006.01)

(52) U.S. Cl. ............... 714/34; 714/30; 714/38; 714/37; 712/227; 712/228

(58) Field of Classification Search ........... 714/30, 714/34, 38; 712/227, 228
See application file for complete search history.

(56) References Cited

U.S. PATENT DOCUMENTS

| | | | | |
|---|---|---|---|---|
| 3,818,458 A * | 6/1974 | Deese | ................. | 714/47 |
| 4,819,234 A * | 4/1989 | Huber | ................. | 717/129 |
| 5,491,787 A * | 2/1996 | Hashemi | ................. | 714/11 |
| 5,533,192 A * | 7/1996 | Hawley et al. | ................. | 714/28 |
| 6,356,960 B1 * | 3/2002 | Jones et al. | ................. | 710/5 |
| 6,484,274 B1 * | 11/2002 | Lee et al. | ................. | 714/38 |
| 6,625,749 B1 * | 9/2003 | Quach | ................. | 714/10 |
| 6,845,470 B2 * | 1/2005 | Austen et al. | ................. | 714/38 |
| 6,857,084 B1 * | 2/2005 | Giles | ................. | 714/35 |
| 6,859,891 B2 * | 2/2005 | Edwards et al. | ................. | 714/30 |
| 6,925,584 B2 * | 8/2005 | Padwekar et al. | ................. | 714/30 |
| 7,100,033 B2 * | 8/2006 | Roth et al. | ................. | 713/1 |
| 7,111,200 B2 * | 9/2006 | Armstrong et al. | ................. | 714/34 |
| 7,124,404 B1 * | 10/2006 | Bebout et al. | ................. | 717/127 |
| 2004/0207630 A1 * | 10/2004 | Moreton et al. | ................. | 345/543 |

OTHER PUBLICATIONS

Wikipedia's RAM revision from Sep. 26, 2003.*
Wikipedia's Remote Procedure Call.*
Wikipedia's RAM revision from Sep. 26, 2003.*
Wikipedia's Remote Procedure Call, unknown date.*

* cited by examiner

*Primary Examiner*—Gabriel Chu
*Assistant Examiner*—Joseph Schell
(74) *Attorney, Agent, or Firm*—Carr LLP; D'Ann N. Rifai

(57) ABSTRACT

The present invention provides for an apparatus employed to debug a program operating in a supplemental processor when the processor's registers are not readable directly by the debugging operation of a main processor. A program operating in main memory halts due to operational errors. The program code lines save to a cache. In the main processor, a pool of memory is reserved. A copy of the data from the nominally inaccessible supplementary processor registers also transfers to the reserved storage area for processing of the program needing debugging. After the program debugging is complete, a copy of the contents of the memory pool is restored to the memory of the target supplemental processor. A copy of the local store register state and remaining local store data returns to main memory.

4 Claims, 3 Drawing Sheets

PROGRAM DEBUG METHOD AND APPARATUS

TECHNICAL FIELD

The present invention relates generally to the field of processor operations and, more particularly, to debugging a program on a limited resources processor.

BACKGROUND

Normally, a program is debugged (errors found and eliminated) on a central processing unit, (CPU) or other processing units (PU) that the program is designed to run on. However when a plurality of PUs are placed on a single chip, it is sometimes desirable to limit the memory available to one or more specialized function processing units (SPUs). At that point, the supplemental processor processes those tasks with its highest efficiency. With this methodology, the number of possible PUs placed on a specified size chip is increased In a conventional system, a debugger will have unlimited access to all of the states in the executable program that is being debugged. The debugger needs to issue read and write commands to a plurality of addresses. Subsequently, the debugger logic modifies the states of executable operations. If the memory or flexibility of the PU is limited, reads and writes may not be possible even if the debugging program employs a master, main or control PU. Furthermore, in order to maximize processing power for specified chip architecture, the main or control PU may not have access to the register state of the SPUs on the chip.

Accordingly, a need exists for a system that efficiently and effectively reduces such problems by developing a procedure to debug a program designed to run on a SPU having limited resources and which does not allow SPU register state access to devices external to the SPU.

SUMMARY OF THE INVENTION

The present invention provides for installing a retrieval program on an SPU having a program needing debugging. The register states deploy to a primary processing unit that performs the debugging process in a pool of memory.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In one embodiment, however, the functions are performed by a processor, such as a computer or an electronic data processor, in accordance with code, such as computer program code, software, and/or integrated circuits that are coded to perform such functions, unless indicated otherwise.

Figure 1:
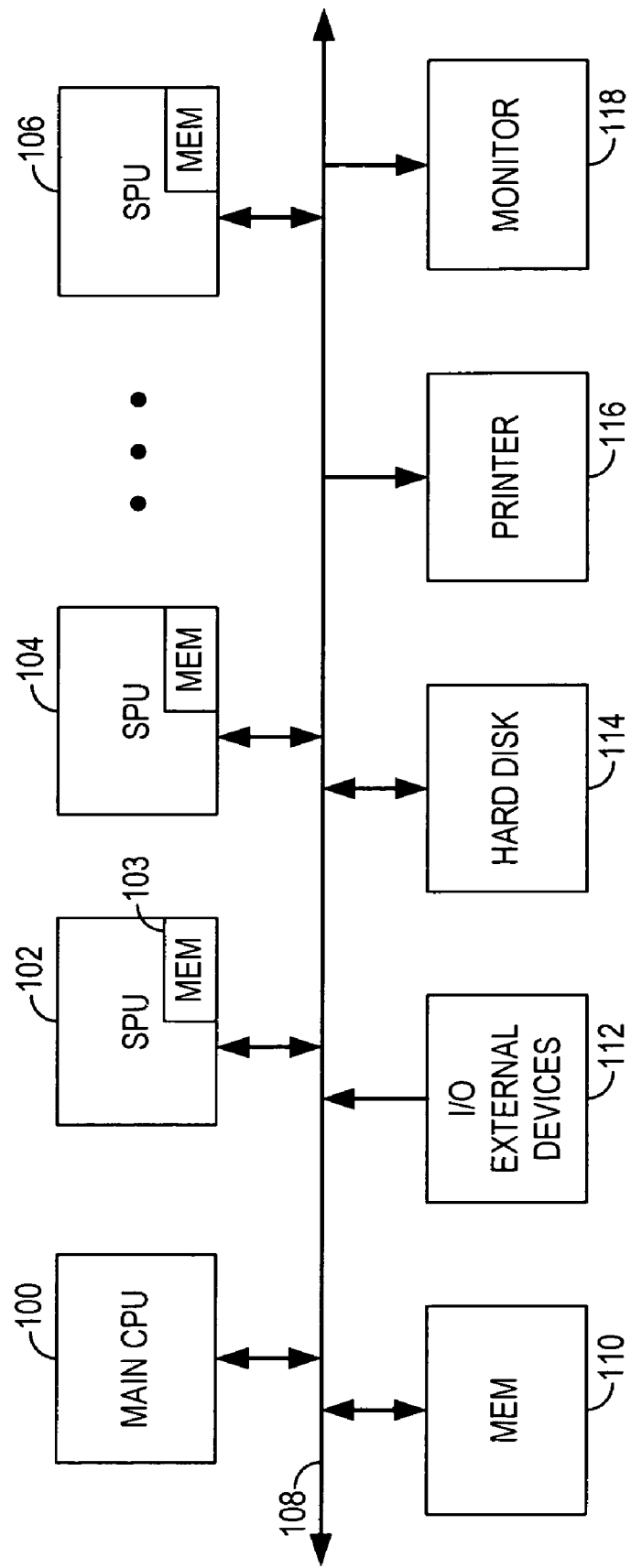
FIG. 1 illustrates a block diagram of a multi-processor environment communicating over a common bus with a plurality of external devices.

Turning to FIG. 1, disclosed is an exemplary diagram of a multi-processor environment in which a processing unit (PU) 100 represents a main, prime or central processor. SPU 102, SPU 104 and SPU 106 are supplemental processors that work with or assist PU 100. At least one of the additional SPUs, such as SPU 102, can be of the type such that the register states cannot be read by PU 100 over a communication bus 108. There are significant purposes for eliminating the ability of other processors reading the register states of interconnected PUs. For example, the need to reduce device complexity and for increasing the number of PUs that can be accommodated within a specified device architecture. Memory 110, Input/Output (I/O) 112, disk drive 114, printer 116 and monitor 118 represent external devices that communicate with at least one of the PUs via bus 108.

As is known to those skilled in the art of coding software, programs do not always work as expected. In diagnosing the reasons for faulty or erroneous operations, "debugging" programs or tools can be used to examine the contents of various registers in the processor. The details of the debugging process are usually obvious and well defined when the processor operating the debugging program is the same processor encountering errors from other programs codes. It is also a reasonably straight-forward and known process to debug a program operating on a limited resource PU using an additional PU. If that subsequent PU has adequate memory resources, the registers of the limited resource PU can be read directly by the subsequent PU if there is an operational interruption of the program debugging process.

Operational halting can occur by placing temporary stops in the debugging program process, then reading and comparing the contents of the appropriate registers to the data that is expected in those registers at that stage of the program operation. When they differ from expected results, elements of the program code can be changed. The program is recompiled to determine if the new code results in eliminating the bug. Alternatively, the contents of some of the registers can be changed and the program may be allowed to continue to see if there are further problem areas in the code. However, neither of these operations can be accomplished if the PU operating the debug cannot read, on direct command, the contents of the registers of the PU running the program to be debugged.

Figure 2:
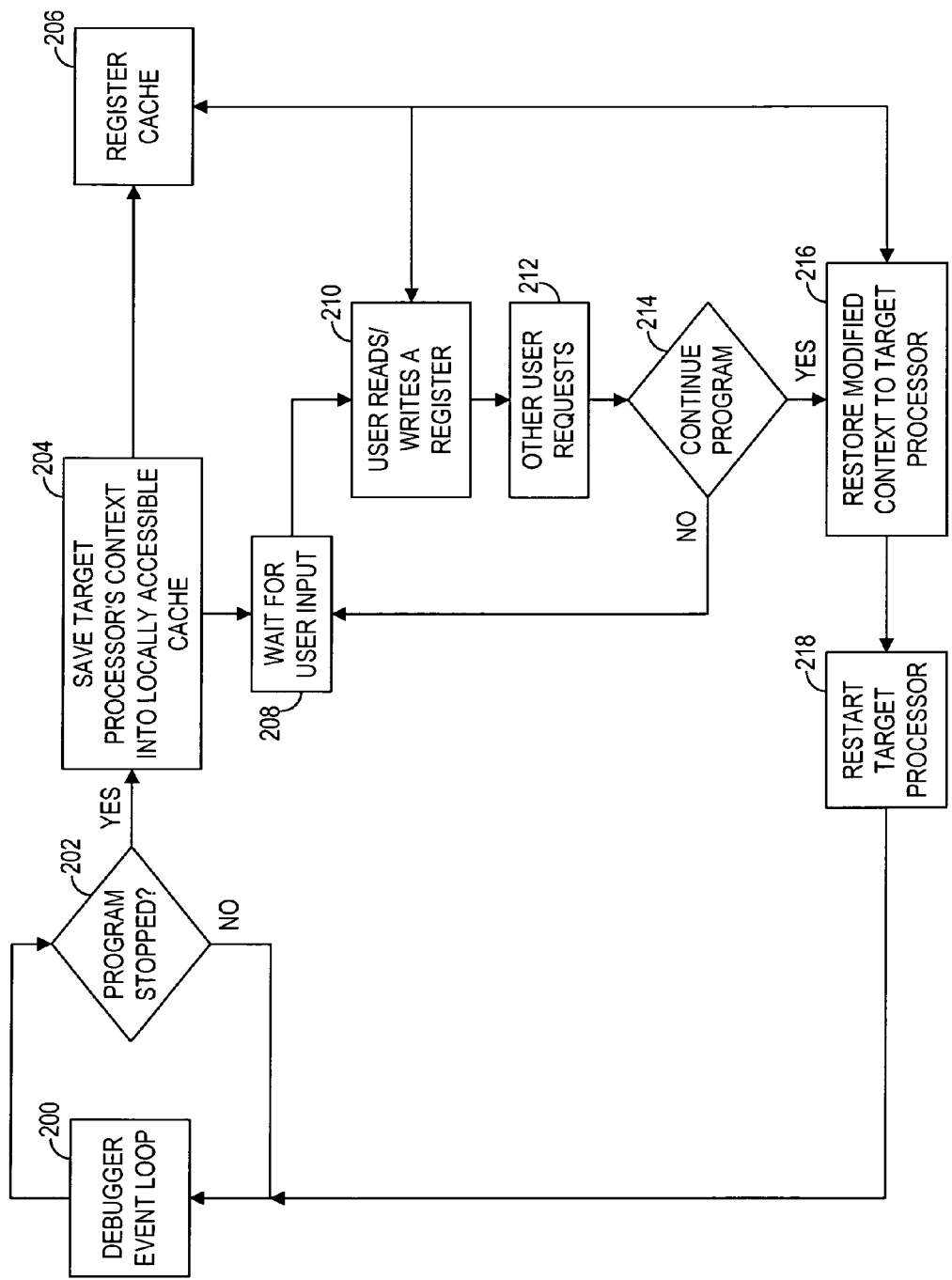
FIG. 2 illustrates a flowchart of high level decisions of a debug program operating in accordance with one embodiment of the invention.

Turning to FIG. 2, illustrated is a flowchart of high level decisions of a debug program operating in accordance with one embodiment of the invention, such as the processor 100 of FIG. 1.

A debugger event loop 200 operates in conjunction with a decision block 202 to detect the occurrence of an inserted command used in the program being debugged, to interrupt the operation of that program. The decision ring comprising debugger event loop 200 and program stopped 202 loops continually until the program being debugged stops. At that time, the debugging program proceeds to a program operation block 204 where a copy program is activated in the limited resource PU under debugging. The copy program operates to send a plurality of indicia from the limited resource PU back to the debugging or main PU. The data sent back, in accordance with the operator of the debugging program may be limited to the contents of certain registers or may include the entire program and all parameters of the limited resource PU. The storage of the data returned is held in storage at register cache 206. The operator of main PU can run the program in memory set aside in local cache.

As shown by the wait for user input 208 block, after the data is stored or placed in memory, the debugging program awaits operator or user input. User defined input at block 210, may read from register cache 206 or write to a space representing a register allocated in memory. Other user requests block 212 accepts additional inputs to the system. A decision block 214 represents a decision by the user to provide more inputs with a return to wait for user input 208 or to restore the modified context data presently in the register cache 206 to a target processor. The target PU restarts because of operation by a restore modified context block 218 and a return is made to debugger event loop 200. If the program in the process of debugging operates as expected, the debugging process then completes. However, the program may not always show an improper operation, and a further check may need to be made of the register values before determining that the program is operating properly.

Figure 3:
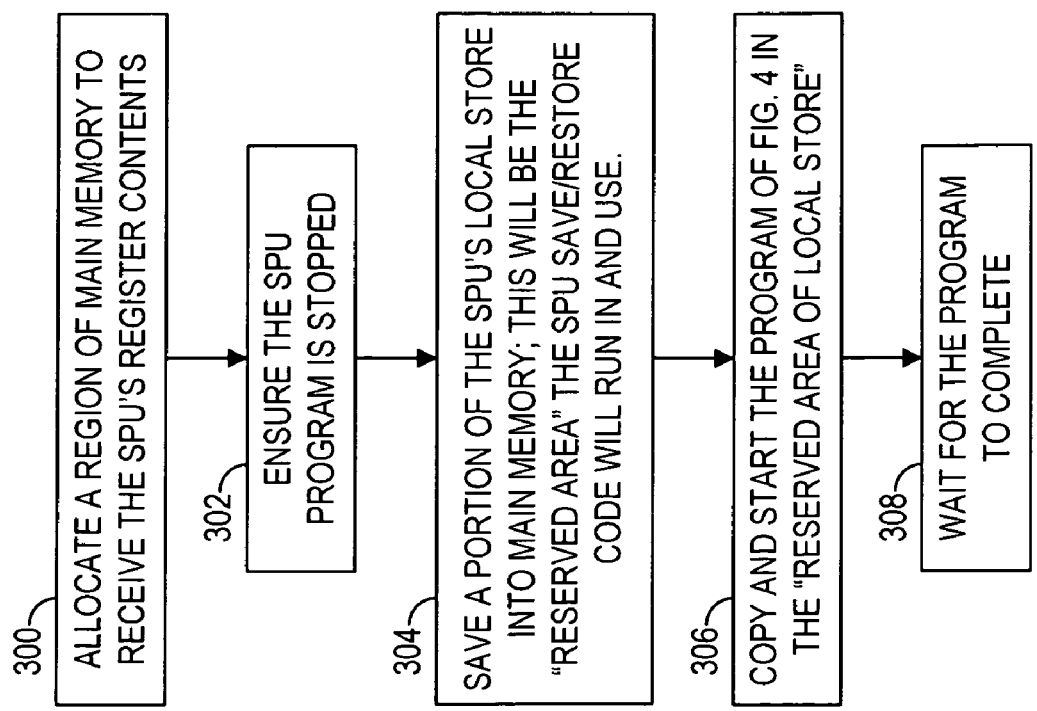
FIG. 3 illustrates a representative state flow diagram for initiating a debugging operation.

Turning to FIG. 3, illustrated is an amplification of the steps required in block 204 of FIG. 2. A portion of main CPU memory 110 from FIG. 1 is allocated to receive the register contents of a auxiliary processor, such as SPU 102. When the program under debugging in PU 102, has stopped due to operational interrupts, the stopped operation is detected and verified in condition block 302. A portion of the SPUs local store or memory, illustrated by a sub-block MEM 103, is saved to MEM 110. This area is reserved in main memory by the debugging program for use by the program being debugged.

Copy and start block 306 completes its cycle and outputs the copied program to the reserved area of the local store, of the specified processor. At a wait state block 308, the deterministic logic waits for the debugging of the program to complete. At the conclusion of the processing, the system waits further instruction from the user input 208 of FIG. 2.

Figure 4:
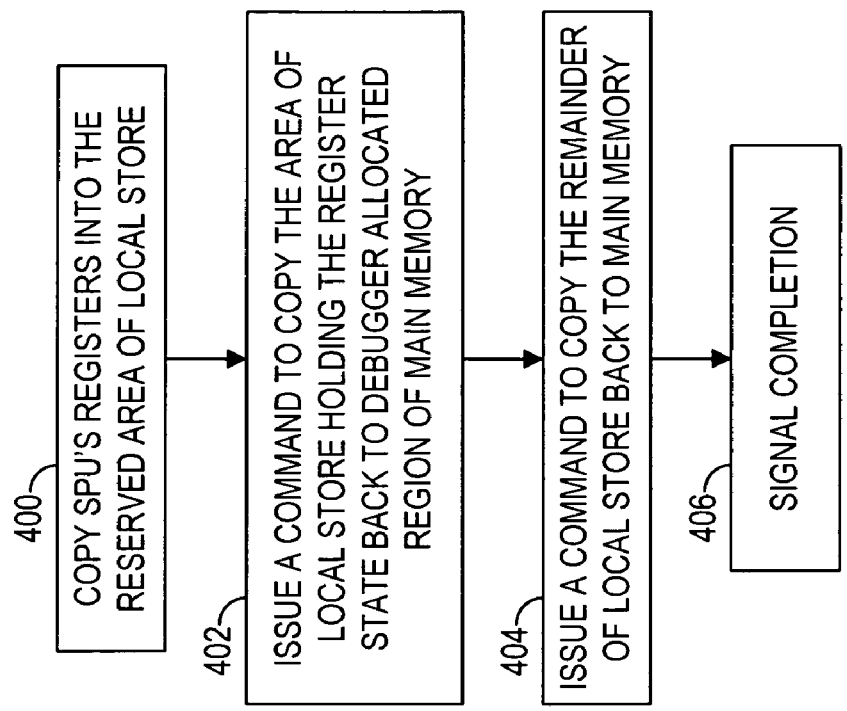
FIG. 4 a representative state flow diagram for terminating debugging operation.

Turning now to FIG. 4, disclosed are the actions of the debugging program as related to the portion of the debugging program activated in the section of memory of the target SPU. After activation of the debugging call from debugger event loop 200 in FIG. 1, the copy SPU's registers block 400, copies the selected register data from the SPU 102 into a block reserved memory allocation at MEM 103. Next, command block 402 issues a command to make a copy of the area of MEM 103 holding the present register state and forward that copy to an allocated portion of CPU 100 memory. Concurrently, command block 402 copies indicia remaining in MEM 103, (which is unrelated to the register state) and forwards that copy to CPU 100. At a minimum, MEM 103 contains the salient data that causes the program halt. There can be additional code lines in MEM 103, which may be related or unrelated to the debugging operation. When the processing of command block 404 is complete, and output is sent to signal completion block 406, the debugger event loop 200 resets and waits for a subsequent program halt instruction.

It is understood that the present invention can take many forms and implementations. Accordingly, several variations may be made in the foregoing without departing from the spirit or the scope of the invention. The capabilities outlined herein allow for the possibility of a variety of design and programming models. This disclosure should not be read as preferring any particular design or programming model, but is instead directed to the underlying mechanisms on which these design and programming models can be built.

Having thus described the present invention by reference to certain of its salient characteristics, it is noted that the features disclosed are illustrative rather than limiting in nature. A wide range of variations, modifications, changes, and substitutions are contemplated in the foregoing disclosure and, in some instances, some features of the present invention may be employed without a corresponding use of the other features. Many such variations and modifications may be considered desirable by those skilled in the art based on a review of the foregoing description. Accordingly, it is appropriate that the appended claims be construed broadly and in a manner consistent with the scope of the invention.

The invention claimed is:

1. A method for debugging a first computer program, the first computer program executable on a first processor in a computer system, wherein the first processor is a specialized function processing unit (SPU), the method comprising:
   activating a debugging program on a main processing unit (MPU) of the computer system, the MPU inoperable to access registers of the SPU directly;
   allocating, by the debugging program, a portion of a main memory of the computer system to store received SPU register contents;
   verifying, by the debugging program, that the first computer program is halted;
   activating, on the SPU, a second computer program;
   transferring, by the second computer program, SPU register contents to the allocated portion of the main memory;
   accessing, by the debugging program, the SPU register contents from the main memory;
   subsequent to accessing the SPU register contents, inspecting the SPU register contents for errors;
   modifying, by the debugging program, the SPU register contents in the main memory, in response to inspecting the SPU register contents;
   transferring, by the second computer program, SPU register contents from the main memory to registers of the SPU; and
   restarting, by the debugging program, the SPU.

2. The method of claim 1, further comprising transferring, by the second computer program, SPU state information to the MPU.

3. The method of claim 2, further comprising:
   allocating, by the second computer program, a portion of a local store of the SPU;
   copying, by the second computer program, SPU register contents to the allocated portion of the SPU local store; and
   wherein transferring, by the second computer program, SPU register contents to the allocated portion of the main memory, comprises copying the SPU register contents from the allocated portion of the SPU local store to the allocated portion of the main memory.

4. The method of claim 3, wherein transferring, by the second computer program, SPU register contents from the main memory to registers of the SPU, further comprises:

copying the SPU register contents from the allocated portion of the main memory to the allocated portion of the SPU local store; and loading the SPU register contents from the allocated portion of the SPU local store to the SPU registers.

* * * * *